US008498624B2

(12) United States Patent  
Nadarajah et al.

(10) Patent No.: US 8,498,624 B2  
(45) Date of Patent: Jul. 30, 2013

(54) METHOD AND APPARATUS FOR MANAGING VOICEMAIL MESSAGES

(75) Inventors: Dinesh Nadarajah, Austin, TX (US); David Wolter, Austin, TX (US); Adam Klein, Cedar Park, TX (US); Rias Muhamed, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1355 days.

(21) Appl. No.: 11/293,945

(22) Filed: Dec. 5, 2005

(65) Prior Publication Data

US 2007/0129059 A1  Jun. 7, 2007

(51) Int. Cl.  
*H04M 11/10* (2006.01)

(52) U.S. Cl.  
USPC ............... 455/413; 455/412.1; 455/412.2; 455/414.1; 704/1; 704/4; 704/200; 704/231; 704/235; 379/88.11; 379/88.14; 379/88.16; 379/88.22; 379/67.1

(58) Field of Classification Search  
USPC 455/413, 412.1–412.2, 415, 414.1; 379/67.1, 379/69, 70, 88.04, 88.19–88.23, 68, 88.11–88.14, 88.16, 88.22; 704/1, 4, 200, 704/321, 235  
See application file for complete search history.

(56) References Cited

U.S. PATENT DOCUMENTS

| | | | |
|---|---|---|---|
| 5,848,137 A * | 12/1998 | Hsiao | 379/110.01 |
| 6,216,106 B1 * | 4/2001 | John | 704/270 |
| 6,449,342 B1 * | 9/2002 | Johanson | 379/88.11 |
| 6,970,906 B1 * | 11/2005 | Parsons et al. | 709/204 |
| 7,356,470 B2 * | 4/2008 | Roth et al. | 704/270 |
| 2002/0154747 A1 * | 10/2002 | Shtivelman | 379/88.19 |
| 2003/0128820 A1 * | 7/2003 | Hirschberg et al. | 379/88.14 |
| 2003/0174818 A1 * | 9/2003 | Hazenfield | 379/88.22 |
| 2004/0174963 A1 * | 9/2004 | Fellenstein et al. | 379/68 |
| 2004/0208304 A1 * | 10/2004 | Miller | 379/210.02 |
| 2004/0213396 A1 * | 10/2004 | MacNamara et al. | 379/210.02 |
| 2005/0008135 A1 * | 1/2005 | Bressler | 379/211.01 |
| 2005/0100143 A1 | 5/2005 | Bedingfield, Sr. | |
| 2006/0083358 A1 * | 4/2006 | Fong et al. | 379/88.13 |
| 2007/0121584 A1 * | 5/2007 | Qiu et al. | 370/352 |
| 2008/0207176 A1 * | 8/2008 | Brackbill et al. | 455/413 |

* cited by examiner

*Primary Examiner* — Wayne Cai  
(74) *Attorney, Agent, or Firm* — Wolff & Samson, PC

(57) ABSTRACT

An apparatus (100, 200) and method are disclosed for managing voicemail messages. A system that incorporates teachings of the present disclosure may include, for example, a voicemail system (100) having a communications interface (110) and a controller (102) for managing operations of the communications interface. The controller is programmed to store (310) voicemail messages corresponding to a communication device (102), transmit (316) a log of the voicemail messages to the communication device, and receive (318) from the communication device a request to delete a voicemail message selectively chosen from a user interface corresponding to the voicemail log. The present disclosure further describes embodiments for the communication device.

8 Claims, 4 Drawing Sheets

METHOD AND APPARATUS FOR MANAGING VOICEMAIL MESSAGES

FIELD OF THE DISCLOSURE

The present disclosure relates generally to voicemail processing, and more specifically to a method and apparatus for managing voicemail messages.

BACKGROUND

Voicemail systems have provided end users a means for staying in touch while in transit, or simply when unavailable. These systems, however, require the end user to access voicemail messages to manage its storage. A need therefore arises for an improved method and apparatus for managing voicemail messages.

DETAILED DESCRIPTION

Embodiments in accordance with the present disclosure provide a method and apparatus for managing voicemail messages.

In a first embodiment of the present disclosure, a voicemail system has a communications interface, and a controller for managing operations thereof. The controller is programmed to store voicemail messages corresponding to a communication device, transmit a log of the voicemail messages to the communication device, and receive from the communication device a request to delete a voicemail message selectively chosen from a user interface corresponding to the voicemail log.

In a second embodiment of the present disclosure, a communication device has a user interface (UI) element, a transceiver for exchanging messages with a communication system, and a controller for managing operations of the UI element and the transceiver. The controller is programmed to receive a log of voicemail messages stored in a voicemail system, present the log to an end user, receive from the end user a selection of a voicemail message from the log for deletion, and transmit to the voicemail system a request to delete the selected voicemail message without listening to said voicemail message.

In a third embodiment of the present disclosure, a method is presented for selectively deleting a voicemail message in a voicemail system from a voicemail log in a communication device.

In a fourth embodiment of the present disclosure, a computer-readable storage medium operates in a voicemail system. The storage medium has computer instructions for deleting a voicemail message in response to a request received from a communication device to delete said voicemail message selectively chosen from a user interface corresponding to a voicemail log.

In a fifth embodiment of the present disclosure, a computer-readable storage medium operates in a communication device. The storage medium has computer instructions for transmitting to a voicemail system a request to delete a voicemail message selectively chosen from a user interface corresponding to a voicemail log without listening to said voicemail message.

Figure 1:
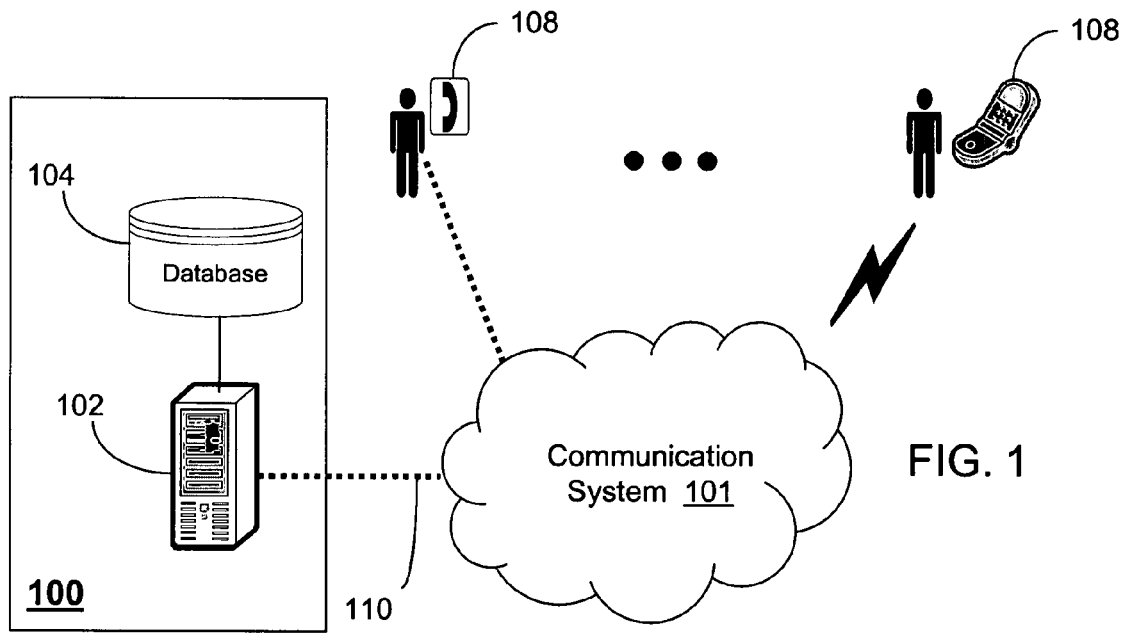
FIG. 1 is a block diagram of a voicemail system and communication devices operating in a communication system according to teachings of the present disclosure.

FIG. 1 is a block diagram of a voicemail system 100 and communication devices 108 operating in a communication system 101 according to teachings of the present disclosure. The voicemail system 100 comprises a communications interface 110, a memory 104 and a controller 102. The communications interface 110 utilizes wired or wireless communications technology for interfacing to the communications network 101. The communications interface 110 can be represented by a circuit switched and/or a packet switched interface. The controller 102 can utilize computing technology such as a scalable server to manage operations of the communications interface 110 and a database for storing voicemail messages corresponding to end users of the communication devices 108 according to the teachings of the present disclosure. The voicemail system 100 can also operate common applications such as an IVR (Interactive Voice Response) system and/or a CRM (Customer Relationship Management) system according to teachings of the present disclosure.

The communication devices 108 can be wireline or wireless devices. In a first embodiment, the communication device 108 can be represented by a POTS (Plain Old Telephone Service), or a voice over IP (VOIP) communications device connected by a wire or cordless interface to a POTS interface. Alternatively, the communication device 108 can be represented by a single mode or multimode wireless mobile device such as a cell phone capable of cellular, WiFi, or WiMax communications. The voicemail system 100 stores voicemail messages when an end user of each of the foregoing embodiments of the communication device 108 is unable, does not desire, or is out of range to answer an incoming call.

Figure 2:
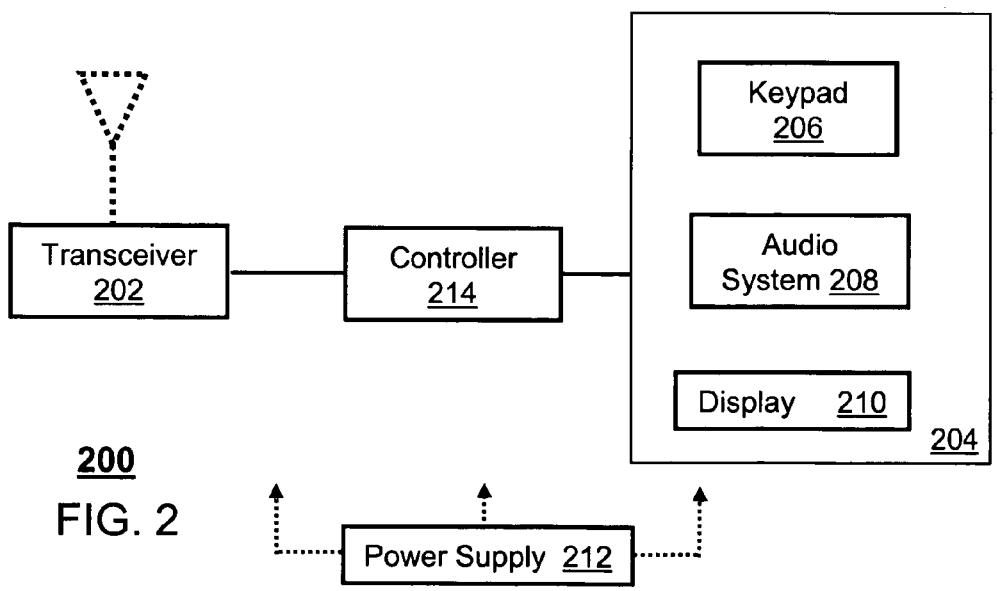
FIG. 2 is a block diagram of the communication device of FIG. 1 according to teachings of the present disclosure.

FIG. 2 depicts a block diagram of the communication device 108 according to teachings of the present disclosure. The communication device 108 comprises a transceiver 202, a user interface (UI) element 204, and a controller 214 for controlling operations thereof. The transceiver 202 can use common technology for wireline and/or wireless communications to support the aforementioned technologies of the communication system 101. The UI element 204 can include among other things a keypad 206, an audio system 208, and a display 210. Each of these embodiments can serve as a user interface for manipulating selectable options provided by the communication device 108, and for conveying messages to the end user according to the present disclosure. The controller 214 can include a computing device such as a microprocessor, or digital signal processor (DSP) with associated storage devices such as RAM, ROM, DRAM, Flash, and other common memories. For portable applications, the communication device 108 can include a power supply 212 with technology for supplying energy to the components of the communication device 108 from one or more rechargeable batteries, and for recharging said batteries.

The communication system 101 can support wireline and wireless communications by way of hybrid circuit and packet switched technologies for interfacing with the communication devices 108. The communication system 101 therefore provides end users of the communication devices 108 the ability to perform end-to-end communications according to a given geographic footprint (e.g., nationwide, statewide, citywide, and so on).

Figure 3:
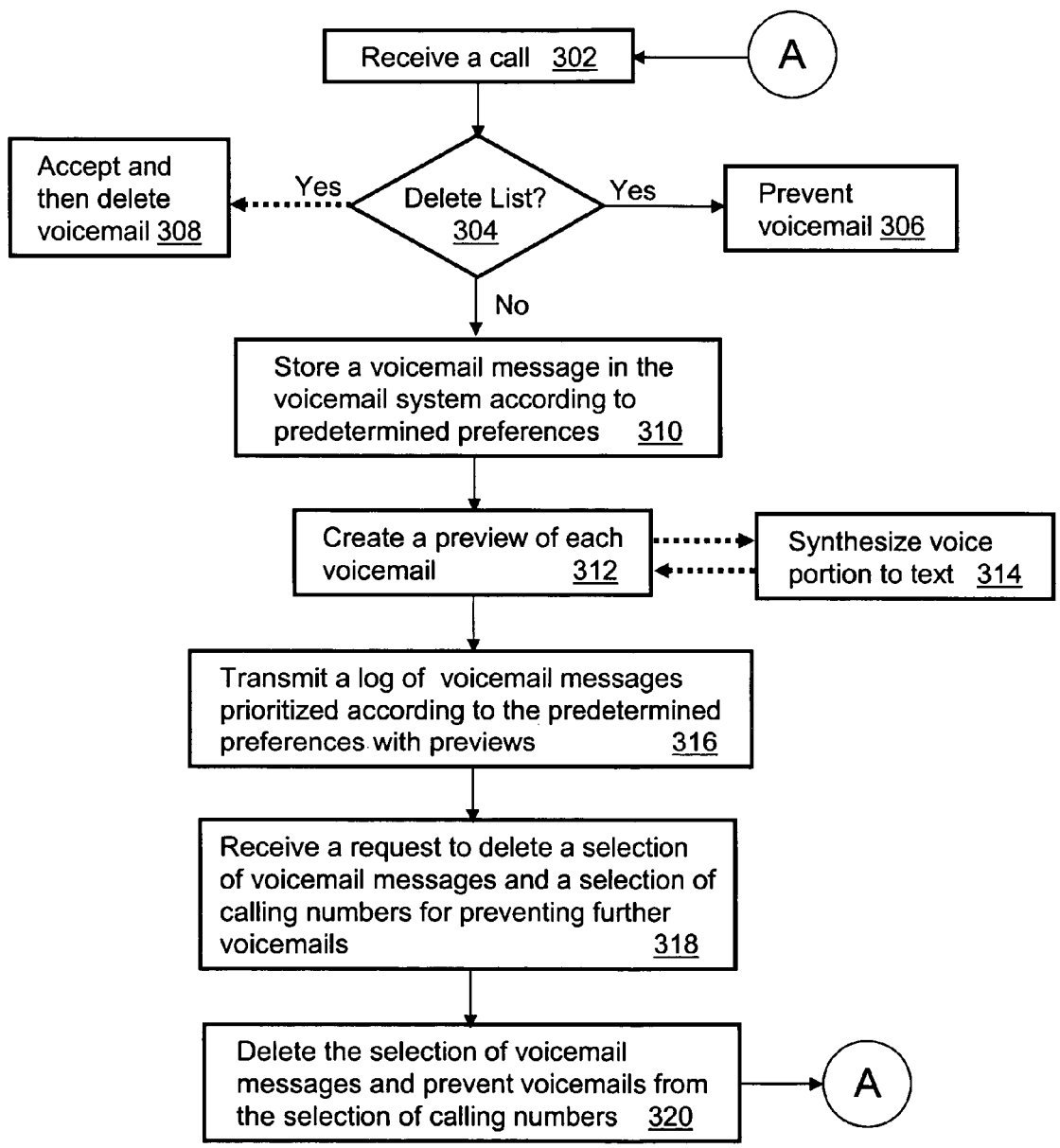
FIG. 3 depicts a flowchart of a method operating in the voicemail system according to teachings of the present disclosure.

FIG. 3 depicts a flowchart of a method 300 operating in the voicemail system 100 according to teachings of the present disclosure. Method 300 begins with step 302 where the controller 102 of the voicemail system intercepts a call from the communication system 101. The controller 102 can be programmed, for example, to intercept a call intended for an end user of a communication device 108 after a number of unanswered rings (such as four or six rings). When the controller 102 detects in step 304 that the calling party is on a list of callers to be prevented from storing voicemails, the controller 102 can proceed to either of the embodiments of steps 306 or 308. This list of callers can be created by the end user of the targeted communication device 108 as will be illustrated in FIG. 4.

In step 306 the controller 102 can be programmed to prevent the presentation of the voicemail process to the caller. Thus, the caller may, for example, hear indefinite rings, or a limited number of rings without a voicemail introductory message. Alternatively, in step 308 the controller 102 can allow the caller to leave voicemail, but automatically deletes the voice message upon delivery without the knowledge of the caller. This latter method provides a less obvious means to prevent voicemail messages.

If the caller is not prevented from leaving voicemail messages, the controller 102 proceeds to step 310 where it stores the voicemail message of the caller according to predetermined preferences. The predetermined preferences can be established by the end user of each communication device 108 and/or the service provider of the voicemail system 100 by common means such as an IVR system or web interface operating in the voicemail system 100. These preferences can, for example, be used to prioritize callers by order of importance (e.g., urgent, high, medium, and low), and/or for grouping callers by class (business, personal). Other preferences can be established, such as for instance, submitting a page (e.g., SMS—short message system) to an end user when receiving critical voice messages.

Once the messages have been prioritized by the preferences, the controller 102 proceeds to step 312 where it creates a preview of each voicemail message. The preview can be a voice preview (e.g., the first 5 seconds of the voicemail), or a text preview. In the latter embodiment, the controller 102 can be programmed to synthesize in step 314 the portion of the voicemail message into text using common voice-to-text translation technologies. In step 316, the controller 102 transmits to the targeted communication device 108 a log of the voicemail messages thus received and prioritized according to the preferences of step 310. Additionally, the controller 102 transmits in this step the voicemail message previews (in voice and/or text).

The communication device 108 can in turn respond with a request in step 318 to delete a selection of voicemail messages. This deletion request occurs without the end user of the communication device 108 having to process the voicemail messages (such as by listening to each message) in order to delete them. In addition to the deletion request, the controller 102 can receive in this step a request to prevent further voicemail messages from a set of calling numbers identified by the end user of the communication device 108. In step 320 the selected voicemail messages are deleted without the end user having to listen to them by way of the voicemail system 100. Additionally, in this step the controller 102 stores the select calling numbers for use in steps 304-308 to prevent voicemail messages from the selected callers.

Figure 4:
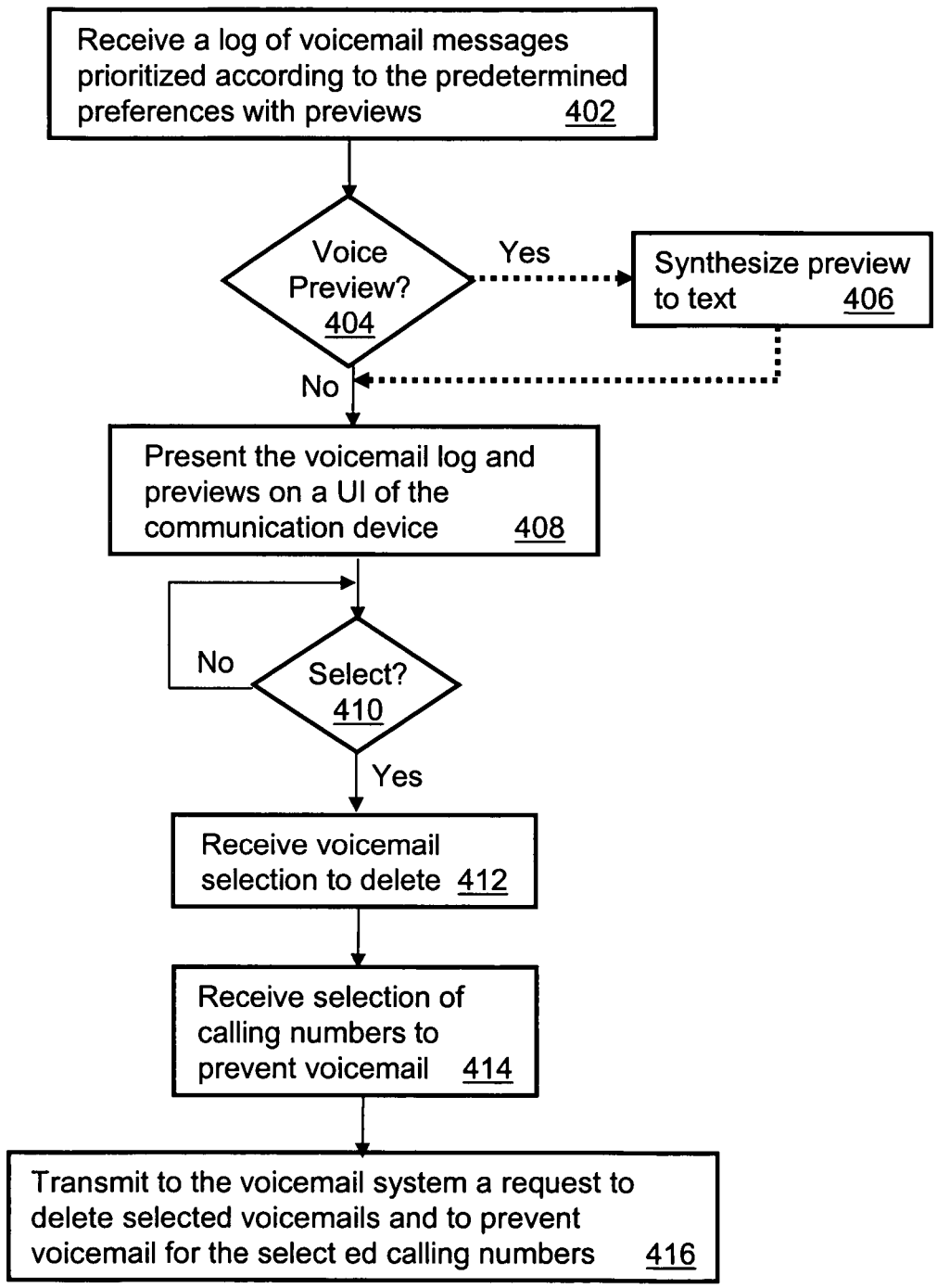
FIG. 4 depicts a flowchart of a method operating in the communication device according to teachings of the present disclosure.

FIG. 4 depicts a flowchart that mirrors some of the functions discussed in method 300. Specifically, FIG. 4 illustrates a method 400 operating in the communication device 108 according to teachings of the present disclosure. Method 400 begins with step 402 where the controller 214 of the communication device 108 is programmed to receive the log of voicemail messages prioritized according to the preferences of step 310 with corresponding previews. In step 404 the controller 214 determines if the previews are voice or text. If they are voice samples, in a supplemental embodiment the controller 214 can be programmed to synthesize in step 406 said voice previews into text utilizing common voice-to-text synthesis technology.

In step 408, the controller 214 presents the voicemail log and previews on the UI element 204. The voicemail logs can comprise the caller ID of the calling party with an indication (e.g., an icon) depicting an associated voicemail message stored in the voicemail system 100 by the caller. The log and previews can be presented as audible messages conveyed by the audio system 208. That is, the end user can, for example, request the controller 214 to audibly describe the log by way of a synthesized text-to-voice application that reads out the caller ID and an indication that a corresponding voicemail message has been received from the caller. The end user can further request the controller 214 by voice command to play the preview voicemail message associated with a caller ID.

For communication devices 108 with a display 210, the controller 102 can convey visual images of text associated with the caller ID, and a symbol or icon to indicate whether the caller has left a voicemail message. The end user can request by voice command or by a keypad 206 entry (having, for example, a navigation disk and selection button) an audible playback of the preview voicemail message of a particular caller ID. If the preview voicemail message has been synthesized into text by the voicemail system 100 (step 314) or the communication device 108 (in step 406), then the end user can simply visualize the preview message on the display 210.

The foregoing embodiments of step 408 do not require the communication device 108 to interact with the voicemail system 100 during the review process. That is, the end user can manage voicemail messages in the log without the help of the voicemail system 100. Thus, the end user can select in step 410 by way of the keypad 206, or by voice command, a number of voicemail messages to delete without ever listening to the full extent of the voicemail message as conveyed by the voicemail system 100 under normal circumstances. In response to the selection process, the controller 214 receives in step 412 the end user's selection of one or more voicemail message for deletion. Additionally, the controller 214 can receive in step 414 a selection of one or more corresponding calling numbers to prevent further voicemails. These selections are transmitted in step 416 to the voicemail system 100. The voicemail system 100 in response deletes the selected voicemail messages in step 320 without further interaction from the end user, and programs the voicemail system 100 to prevent in steps 304-308 further voicemail messages from the selected calling numbers.

It would be apparent to one of ordinary skill in the art that the foregoing embodiments for methods 300 and 400 can be modified without departing from the scope and spirit of the claims described below. For instance, the voicemail blocking features described in steps 304-308, and 414-416 can be removed while remaining within the operational bounds of said claims. Accordingly, attention should be given to the claims to determine the scope of the present disclosure.

Figure 5:
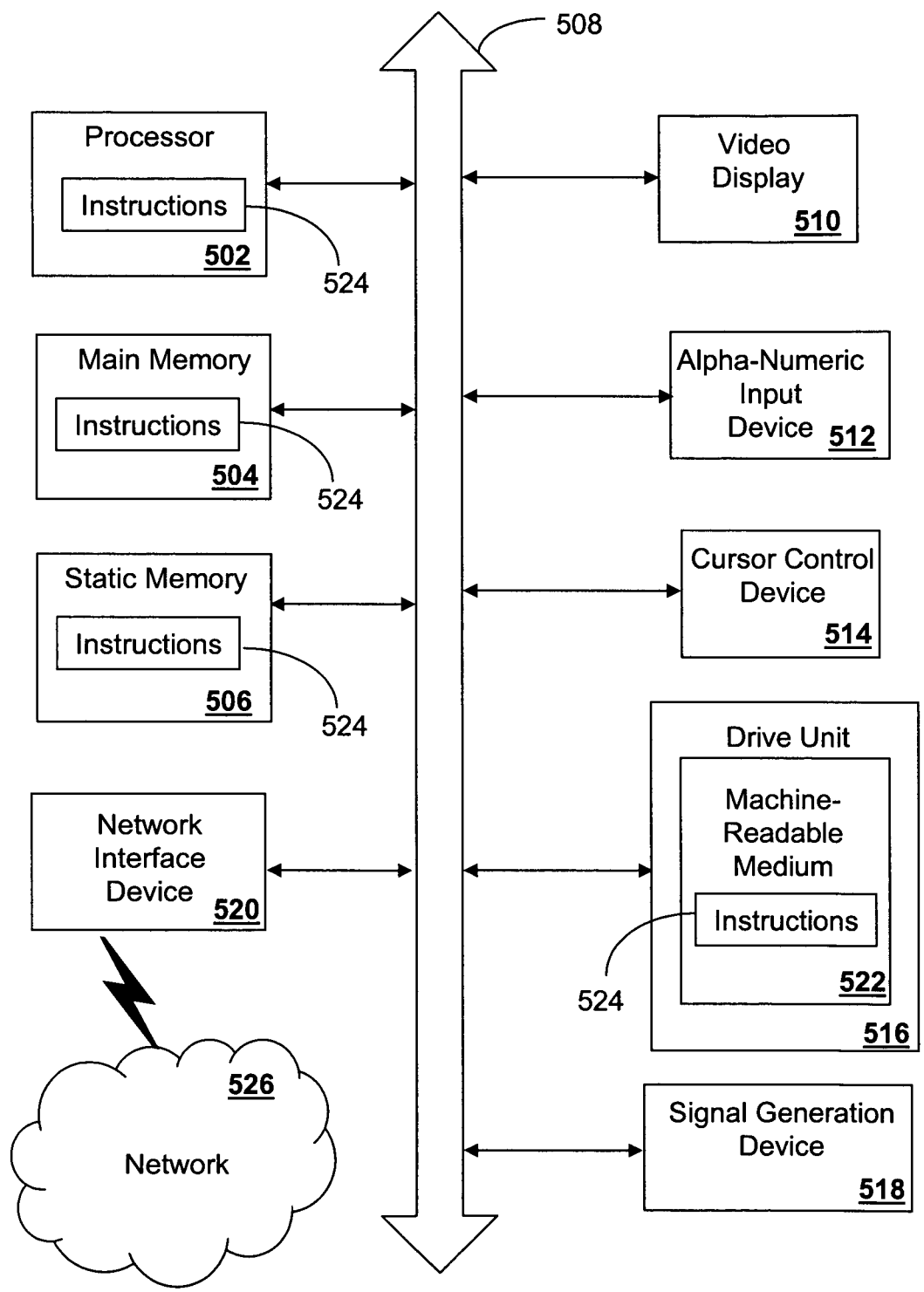
FIG. 5 is a diagrammatic representation of a machine in the form of a computer system within which a set of instructions, when executed, may cause the machine to perform any one or more of the methodologies discussed herein.

FIG. 5 is a diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A voicemail system, comprising:
   a communications interface; and
   a controller for managing operations of the communications interface, programmed to:
   store a plurality of voicemail messages corresponding to a communications device;
   transmit to the communications device a voicemail log of the plurality of voicemail messages, and a preview of each of the plurality of voicemail messages without transmitting the entire voicemail message, the preview for a respective voicemail message comprising a voice preview of the first n seconds of the voicemail message, where n is an integer, for review by an end user and selection of a particular voicemail message for deletion from a user interface corresponding to the voicemail log, without any interaction with the controller of the voicemail system during the review and the selection; and
   receive from the communication device a request to delete the voicemail message selectively chosen from the user interface corresponding to the voicemail log;
   receive one or more calling numbers from the communication device; and
   delete voicemail message entries associated with the one or more calling numbers based on the selection by the end user of the particular voicemail message for deletion from the user interface, and then prevent further voicemail message entries associated with the one or more calling numbers.

2. The voicemail system of claim 1, wherein the controller is programmed to generate the previews by generating a voice preview of the selected portion of each voicemail message in the log.

3. The voicemail system of claim 1, wherein the controller is programmed to:
   store voicemail messages according to predetermined preferences; and
   transmit to the communication device the log of voicemail messages according to the predetermined preferences.

4. A communication device, comprising:
   a user interface element;
   a transceiver for exchanging messages with a communication system; and
   a controller for managing operations of the user interface element and the transceiver, wherein the controller is programmed to:
   receive a log of a plurality of voicemail messages stored in a voicemail system and a preview of each of the plurality of voicemail messages, without receiving the entire voicemail message, the preview for a respective voicemail message comprising voice preview of the first n seconds of the voicemail message, where n is an integer;
   present the log and the previews to an end user for review;
   receive from the end user a selection of a particular voicemail message from the log for deletion, without any interaction with the voicemail system during the review and the selection by the end user; and
   transmit to the voicemail system a request to delete the selected voicemail message without listening to the voicemail message,
   receive a selection of one or more calling numbers corresponding to one or more voicemail messages in the log; and
   delete voicemail message entries associated with the one or more calling numbers based on the selection by the end user of the particular voicemail message for deletion from the user interface element, and then transmit to the voicemail system the selection of one or more calling numbers for preventing voicemail message entries corresponding to the selection by the end user.

5. The communication device of claim 4, wherein the controller is programmed to:
   synthesize the voice preview of each voicemail message to text; and
   convey to the end user the synthesized text of each voicemail message in the log for previewing.

6. The communication device of claim 4, wherein the controller is programmed to:
   receive from the voicemail system the log of voicemail messages according to the predetermined preferences; and
   convey to the end user the log according to the predetermined preferences.

7. The communication device of claim 4, wherein the user interface element comprises at least one among a display for conveying images or text, an audio system for exchanging audible messages with the end user, and a keypad.

8. The communication device of claim 4, wherein the transceiver comprises at least one among a wireless transceiver and a wireline transceiver.

* * * * *